United States Patent

[11] 3,630,370

| [72] | Inventor | James K. Quina |
| | | Coral Gables, Fla. |
| [21] | Appl. No. | 20,080 |
| [22] | Filed | Mar. 16, 1970 |
| [45] | Patented | Dec. 28, 1971 |
| [73] | Assignee | Royal Palm Beach Colony, Inc. |
| | | Miami, Fla. |
| | | Continuation of application Ser. No. 811,785, Apr. 1, 1969, now abandoned. This application Mar. 16, 1970, Ser. No. 20,080 |

[54] SEPTIC SOLIDS RETAINER
12 Claims, 8 Drawing Figs.

[52] U.S. Cl. .................................................... 210/170, 210/532, 210/538
[51] Int. Cl. ...................................................... B01d 21/24
[50] Field of Search ............................................ 210/532, 532 S, 170, 83, 519, 538, 540, 247; 239/594, 521

[56] References Cited

UNITED STATES PATENTS

| 1,238,199 | 8/1917 | Rudolph | 210/247 |
| 2,143,248 | 1/1939 | Otto | 210/532 |
| 3,275,157 | 9/1966 | Stamps | 210/521 |
| 1,978,721 | 10/1934 | Perkins | 239/521 X |
| 3,101,176 | 8/1963 | Goss | 239/521 X |

FOREIGN PATENTS

| 167,011 | 10/1950 | Austria | 210/538 |
| 128,361 | 5/1950 | Sweden | 210/538 |
| 1,036,771 | 8/1958 | Germany | 210/532 |

*Primary Examiner*—Frank A. Spear, Jr.
*Attorney*—J. T. Martin

ABSTRACT: A septic solids retainer incorporated into a septic tank in such a manner as to retain solids by preventing the normal tank circulation from occurring within the outlet chamber.

INVENTOR
JAMES K. QUINA

BY  J. T. Martin
ATTORNEY

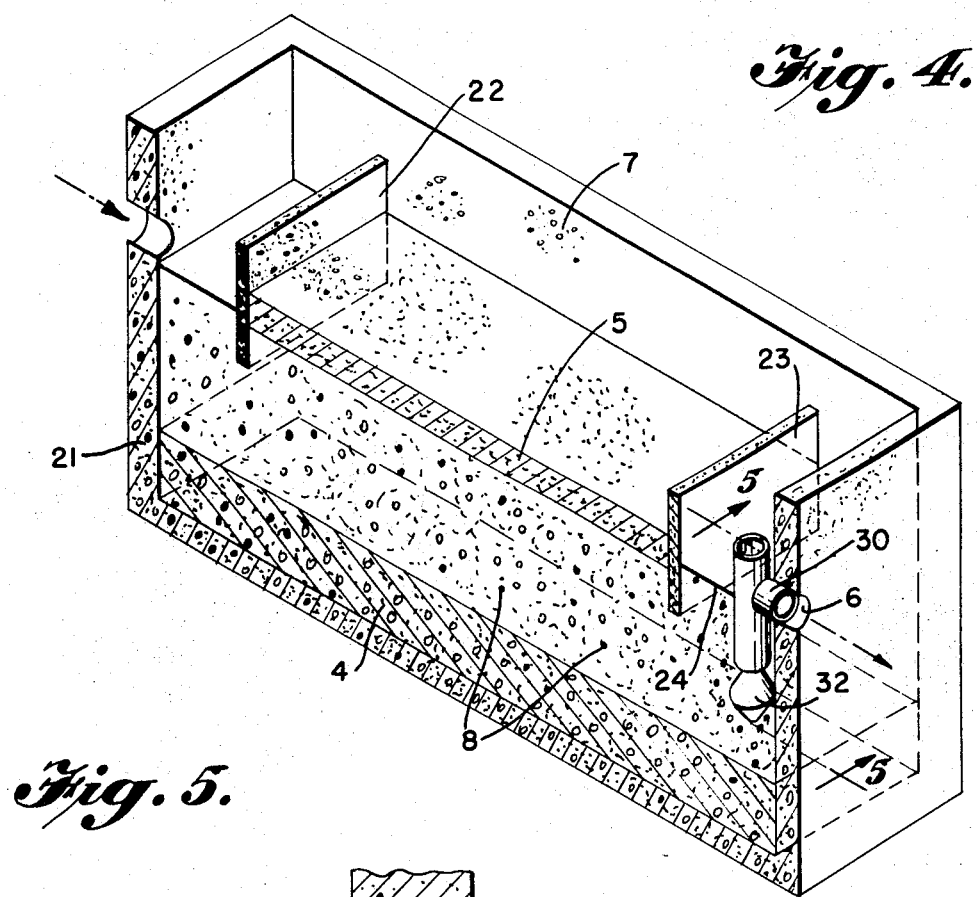
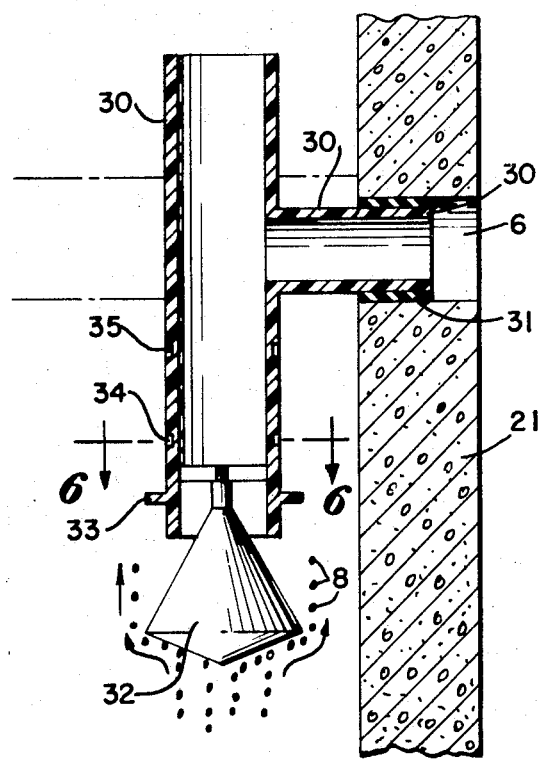
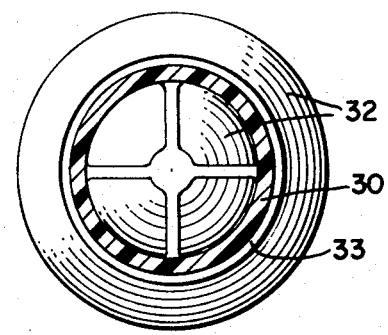
INVENTOR
JAMES K. QUINA
BY J. T. Martin
ATTORNEY

PATENTED DEC 28 1971

INVENTOR
JAMES K. QUINA

BY J. T. Martin
ATTORNEY

SEPTIC SOLIDS RETAINER

This is a copending continuation of application Ser. No. 811,785 filed Apr. 1, 1969 by James K. Quina, now abandoned.

Septic tanks are used to provide economical residential and commercial waste disposal in unsewered areas. They have a poor quality effluent which is difficult to handle or treat further. Thus, they are limited to residential and commercial usage in unsewered areas. The effluent from a septic tank is generally of about the same quality as the influent except that large solids have been broken into small solids. The final digestion of septic tank sewage is in the drainfield. Specific tanks will function properly until the solids in the effluent clog the drainfield pores, stopping the flow of effluent out of the tank.

The digestion of sewage in a septic tank is accomplished by fermentation. The bacteria involved in this digestion thrive under anaerobic conditions and are effected by seeding, temperature, moisture, mixing and acidity. Seeding is accomplished by mixing of fermenting sewage with fresh sewage. Activity increases with temperatures up to about 100° F. Mixing in a fluid condition is essential to digestion. Optimum acidity for digestion is 6.5 to 8.0 pH. Digestion is inhibited at an acidity of 4.5 to 6.5 and ceases being effective at an acidity of 4.5 or lower.

The fermentation action generates large volumes of gases. Gas bubbles rising through the sludge and water tear loose particles of sludge which rise with the bubbles to the surface and settle again to the bottom as the gas is freed. This movement of sludge and gas, coupled with normal settling, causes constant stirring and mixing of sewage. Raw sewage mixes with stale or ripe sewage, further seeding the raw sewage.

Generally, unless there has been an unusual acidity change affecting the fermentation in a septic tank, a septic tank does not fail. Failures in a septic tank usually occur in the drainfield. These failures normally occur because of carryover of scum sludge to the drainfield or an inadequate drainfield for the percolation of the soil. Carryover of solids, especially greases, clogs the soil and prevents the normal drainage of liquid from the tank. The size of the drainfield is generally required to be large enough to allow the normal drainage of liquid from the tank. The size of the drainfield is generally required to be large enough to allow the normal effluent from a septic tank to the poor and the solids to be carried over to ferment and complete digestion in the field. The constant circulation of fluids in a septic tank coupled with the usual design of a standard septic tank allows large amounts of solids to be carried to the field. This is especially true of the large septic tanks which use baffles in lieu of outlet tees.

The entire scum layer which forms within the outlet chamber between the baffle and the outlet aperture, or within the outlet tee, will carry over into the field. Also, the solids that are rising and falling in the tank near the surface of the liquid adjacent the outlet of the tank will carry over into the field while the tank is draining. A much higher ratio of solids to liquid is carried over to the field than exists in an equal volume of the liquid remaining in the tank. This is true because solids accumulate adjacent the outlet of present septic tanks concentrating the ratio of solids to liquid adjacent the outlet prior to their discharge into the drainfield. And, the floating scum which accumulates, between periods when a tank drains, is carried to the field on the first flow. In addition to this accumulation, gas-borne particles, lingering at the surface while the entrained gas escapes, would also be skimmed off and swept into the field.

This carryover problem is accentuated by the fact that inflow to a septic tank does not appreciably affect the water level. Thus, the outflow, being a weir action, is considerably slower than inflow. The draining of the tank over such a weir acts as a skimmer. All solids that rose to the surface of the liquid near this outlet weir would be skimmed off to the drain field. As an example, consider a 1,000-gallon septic tank having a depth of 4 foot 0 inches. A flow adding 25 gallons to this tank is 4 minutes would raise the water level in the tank 0.1 foot. This rise would cause a flow of 0.001 c.f.s. in a 4-inch pipe, or about 0.45 g.p.m. The water would drain away in 55 minutes, thus causing the concentration of any suspended solids at the tank outlet to carry over into the drainfield. The solids carried over in a normal septic tank are long, stringy solids like pieces of tobacco. These mat into a golden brown paste bed at the drainfield bottom that is nearly impervious to water. Thus, the drainfield is clogged by a buildup of this paste bed.

Imhoff, in the early days of the use of septic tanks in municipal systems, conceived of the idea of constructing a settling chamber in a septic tank which would permit sewage to flow through the tank and the solids to settle out into a digestion chamber. The sewage in the settling chamber was not seeded with putrid, stale sewage because the settling chamber was protected with a septic solids retainer baffle. Almost no digestion took place in this settling chamber. Solids, which settled through the septic solids retainer-protected slot in the settling chamber, digested in the digestion chamber. This digestion was similar to that found in a septic tank. The liquified, or digested sewage, left the digestion chamber through the septic solids retainer-protected baffles of the settling chamber and passed on to further treatment with the settling tank effluent. The passing of this digested sewage through the settling chamber did not reduce the quality of the settling chamber effluent nor make it harder to treat; in fact, this effluent was relatively easy to treat further.

Notably, the color of the liquor and sludge in the Imhoff digestor changed from a golden brown to a grey-black. The sludge, when it was withdrawn to be disposed of, was of high quality, and was easy to handle. It was black and granular in nature, like cigarette ashes. It drained well and dried into a substance that could easily be handled with a shovel.

The Imhoff tank provided a consistently high degree of sewage digestion, proving to be a much superior tank. However, the septic solids retainer-protected opening in the settling tank and the sloped walls of the settling chamber required daily maintenance to prevent the buildup of solids to prevent septic conditions from occuring in this chamber. This requirement for regular maintenance has limited Imhoff devices to municipal systems where maintenance can be provided.

Consequently, there has been a need for a septic solids retainer that will provide an effluent sufficiently free of solids to avoid drainfield clogging. This need is for a sewage treatment system for both residential and commercial use, this is economical to buy and operate, will retain large volumes of solids and greases until they have become digested, does not require mechanical equipment, power, or chemicals to operate, provides a high degree of treatment and produces a sludge and effluent that is easy to treat further if, and when, necessary.

A study was made at the Illinois Engineering Experiment Station from 1947 to 1950 to correlate the effects of the period of retention and basic tank construction on tank efficiencies. The effects of added or changed features of tank construction were observed and recorded. And, the corrosion resistance of Asbestos Bonded steel tanks were compared to plain, or asphalt-coated, steel tanks. The results of the study were reported in Illinois Engineering Experiment Station Bulletin No. 409.

These tests, run on septic tanks of varying dimensions, including two Imhoff tanks, illustrated that remarkable improvements were possible in septic tank effluent. These tanks were summarized by an article entitled "Improving Septic Tank Efficiency With a Gas-Deflection Baffle," appearing in *Water & Sewage Works*, Mar. 1954. That study recognized that any device which might be added at small cost to a standard septic tank to retain solids and prevent their carryover in the effluent would be of benefit to the septic tank owner and the public health authorities.

This article claimed that a baffle called the "Hamilton Baffle" or "Hamilton Gas-Deflection Baffle, " shown as a corbel beneath the outlet, extending down into the sludge storage space of the tank, would materially improve septic tank efficiency. It claimed that such a device could be added to a septic tank provided that the outlet chamber was constructed so as to always contain at least a volume of 12 to 15 gallons of liquid. That latter requirement of construction of the outlet chamber has resulted in limiting the adaptability of the Hamilton system to only a comparatively small number of existing, or standard, septic tanks.

Because of that latter requirement, the Hamilton system has remained unused. The large majority of septic tanks in use are unsuited to the encasement of such a large volume of water near the tank outlet. These residential tanks are too small, and the relative distance of waterline to bottom, too shallow to allow practical installation of such a surge chamber. And, the distance below the outlet tee to the tank bottom is insufficient to allow the installation of such a large surge chamber and corbel.

One improved version of the Hamilton system was patented by Stamps in U.S. Pat. No. 3,275,157 issued in 1966. In that patent, the Hamilton system of combining a gas-deflection baffle of sufficient dimensions with a surge chamber was embodied in a specific type of outlet housing. Stamps described a standard Imhoff settling chamber outlet device reduced in size to encompass the "Hamilton" requirements of sloping sides and 12 to 15 gallons surge volume in the outlet chamber. The outlet on a standard septic tank will not accommodate Stamps' device, thus its use is limited, like Hamilton's, to new tanks of special construction.

By more recent experimentation, it has been proven that the 12 to 15 gallons minimum surge capacity required by Hamilton is not required. With the proper septic solids retainer device, the effluent, regardless of surge, is relatively free of settleable solids. Thus, the need for a large, settling surge chamber has been eliminated. With the proper septic solids retainer, the surge, or outlet, chamber need only be that required to retain the scum layer, and can be the standard outlet tee as it exists in most existing septic tanks or tank forms.

It is an object of this invention to provide a more practical manner of converting standard residential or commercial septic tanks to septic solids retainer tanks whose effluent is at least as trouble free as that produced by the Hamilton, Stamps or Imhoff systems.

Another object of this invention is to reduce maintenance, cleaning and repair costs required for present septic tanks and their drainfields.

A further object is to provide a relatively inexpensive and easily installed means for improving the effluent of existing septic tanks.

FIG. 1 of the drawings accompanying this specification is a cross-sectional view of a standard septic tank including a built-in outlet tee equipped with means constructed according to the present invention.

FIG. 4 is a cross-sectional view of a standard septic tank including scum baffles equipped with means constructed according to the present invention.

FIG. 5 is a fragmentary cross-sectional view of means for the deflection of gas borne solids from the effluent inserted in the outlet aperture of a standard septic tank of the type shown in FIG. 4 taken along the lines 5—5.

FIG. 6 is an overhead cross-sectional view of the septic solids retainer inserted in the outlet aperture of a standard septic tank of the type shown in FIGS. 4 and 5 taken along the lines 6—6.

Figure 1:
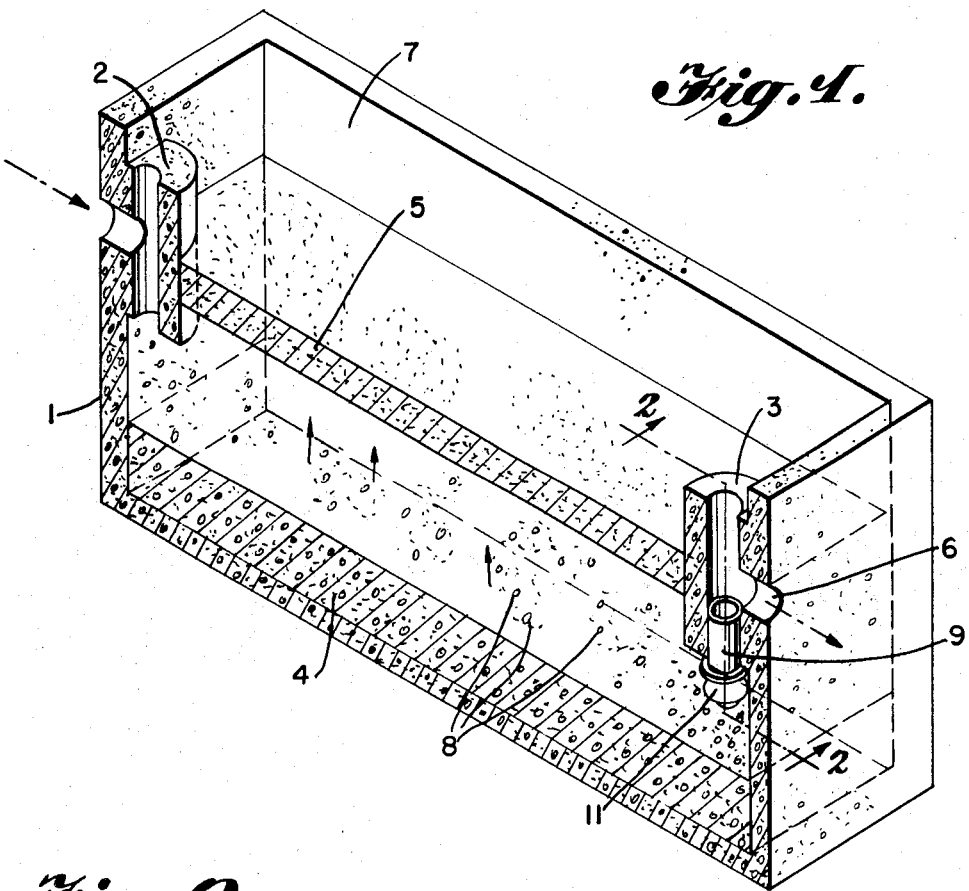

Referring to these drawings by reference numbers, a standard septic tank 1 is shown in FIG. 1 provided with an inlet tee 2 and an outlet tee 3. Inlet tee 2 serves as a vent for the tank and drain field, and retains the scum layer 5. Outlet tee 3 serves as a vent for the tank and drain field, and prevents the scum layer 5 from being carried out to the drain field through the outlet of effluent aperture 6.

Tees 2 and 3 extend about 40 percent down into the liquid depth of a standard septic tank. The total liquid depth in a standard septic tank is generally 2½ to 5 feet. Tees 2 and 3 extend about 6 to 7 inches above the liquid level in a standard septic tank.

Sludge layer 4 contains settled solids in a state of fermentation. During the fermentation or purification large volumes of gases are generated. The action is so vigorous that at times the whole tank appears to be boiling. This boiling that occurs in sludge layer 4 stirs the sludge as soup is stirred during boiling. This stirring action tears loose particles 8 of sludge that are carried to the surface by gas bubbles and are freed to settle again upon release or escape of the gas through the scum layer.

Scum layer 5 consists of greases, fats, oils, other floating solids and gas-borne particles. This purification, is generally up to twelve inches thick and approximately 20 percent of it is above the liquid level. Above scum layer 5 is the freeboard 7 or airspace generally about 8 to 12 inches deep and covered by a suitable lid not shown. Sewage enters a standard septic tank through the inlet tee 2 as the plumbing is used. Plumbing breaks down flow slugs to a slow stream. The dimensions of a standard septic tank are such that the tank holds 12 to 24 hours' flow storage plug sludge volume. Flow through a septic tank is laminar; thus, gas-generated circulation is the prime motive force in a tank. Solids which enter the tank separate into light solids which rise to become part of the scum layer 5 and heavy solids which settle to the sludge layer 4. Both the scum layer 5 and the sludge layer 4 liquify by fermentation. The gas generated during fermentation gives the septic tank, at times, the appearance of a boiling pot. The gas bubbles passing through the sludge tear loose particles of sludge 8 and carry them to the scum layer 5. Some remain as a part of the scum layer 5; others settle as the adhering gas is released. As the flow into a tank is a slow stream, it will not appreciable affect the liquid level in a tank. The flow out over the outlet weir is slower still.

All scum formed in the outlet tee chamber between flows is washed over the weir when a flow starts. All scum and other particles carried to the surface of the liquid in the outlet chamber during flow will be washed over the weir to the drain field. In order to avoid this deleterious carryover, the rising gas with its entrained solids is deflected from the base entrance to the outlet tee 3. It is not necessary that a surge, or settling, chamber be constructed, but only that the rising gas-borne particles be effectively deflected from rising within the outlet tee.

Figure 2:
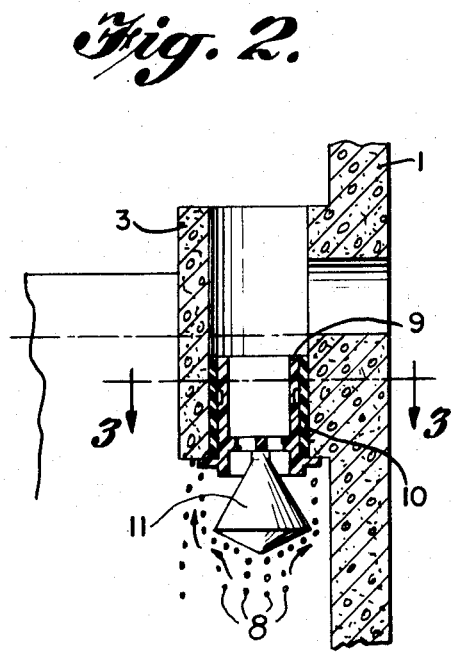
FIG. 2 is a fragmentary cross-sectional view of means for the deflection of gas borne solids from the effluent inserted in the outlet tee of a standard septic tank of the type shown in FIG. 1 taken along the lines 2—2.
Figure 3:
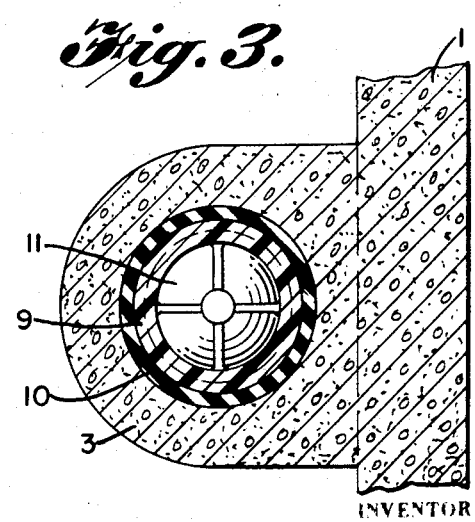
FIG. 3 is an overhead cross-sectional view of the septic solids retainer inserted in the outlet tee of a standard septic tank of type shown in FIGS. 1 and 2 taken along the lines 3—3.

The means for providing such an effective deflection of gas can assume varied forms. FIG. 2 shows one such septic solids retainer inserted into the outlet tee 3 of a tank 1. This septic solids retainer comprises a sleeve 9 fastened in the lower section of the outlet tee. The sleeve is made gastight against the interior wall of tee 3 by seal 10. This seal is to prevent rising gas-borne particles from seeping up the tank wall to the tee, and up the tee to the outlet aperture by passing between tee 3 and sleeve 9.

A solids deflector cone 11 is suspended below sleeve 9. The method of fastening cone 11 to sleeve 9 is unimportant as long as the attachment means does not obstruct the flow. Cone 11, sleeve 9 and seal 10 are impervious to gas or liquid. By the use of this device, liquid is allowed to flow freely around the base of cone 11 into sleeve 9. Since there is no surge effect in sleeve 9 or tee 3, the deflected rising sludge 8 is not drawn into sleeve 9.

By deflecting and thus retaining solids in the digestion chamber until they are more completely digested, a greater degree of digestion results. Settleable solids are considerably reduced and turbidity is improved. Further, the nature of the solids that do settle out immediately, or within weeks, after passing out of the tank having a septic solids retainer, is greatly superior to the nature of the solids from a septic tank. Solids so formed are grey-black in color and granular in nature. When wet, they are less cohesive and adhesive than septic tank effluent sludge. When dry, they drain readily, exhibiting the characteristics of dirt. This factor alone, even without the reduction is settleable solids, insures a longer drainfield life with less maintenance than any system now in use.

Figure 7:
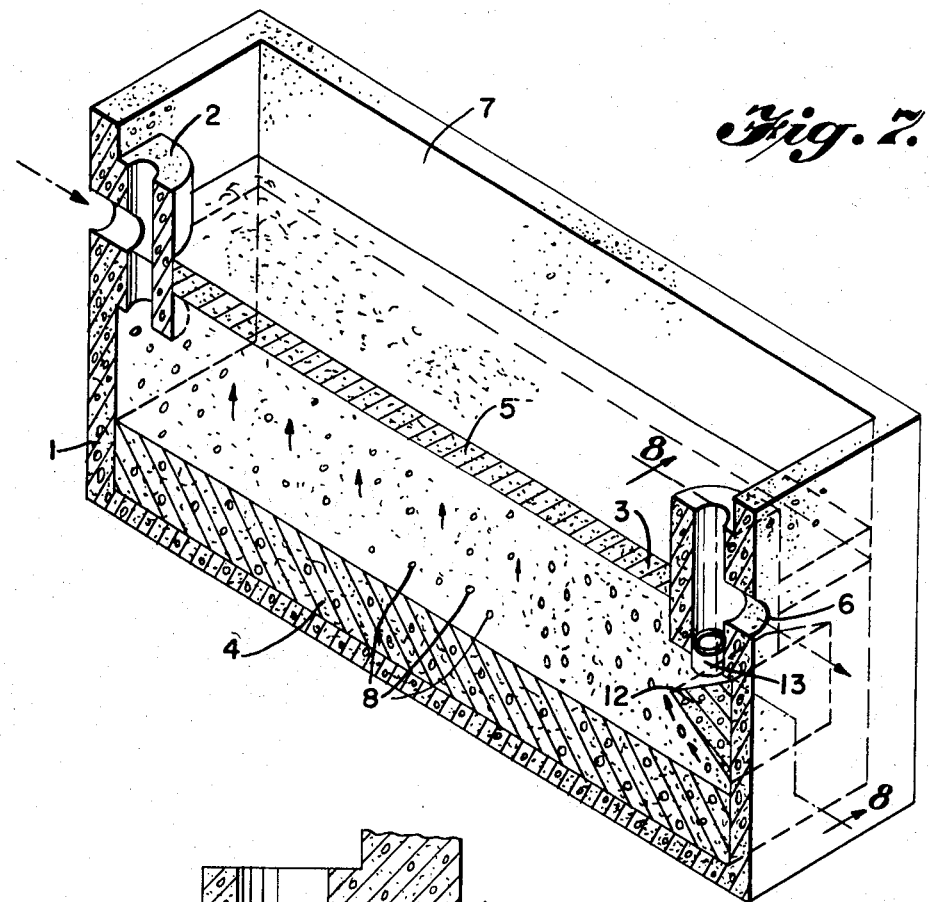
FIG. 7 is a cross-sectional view of a standard septic tank including a built-in outlet tee equipped with septic solids retainer means constructed according to the present invention.
Figure 8:
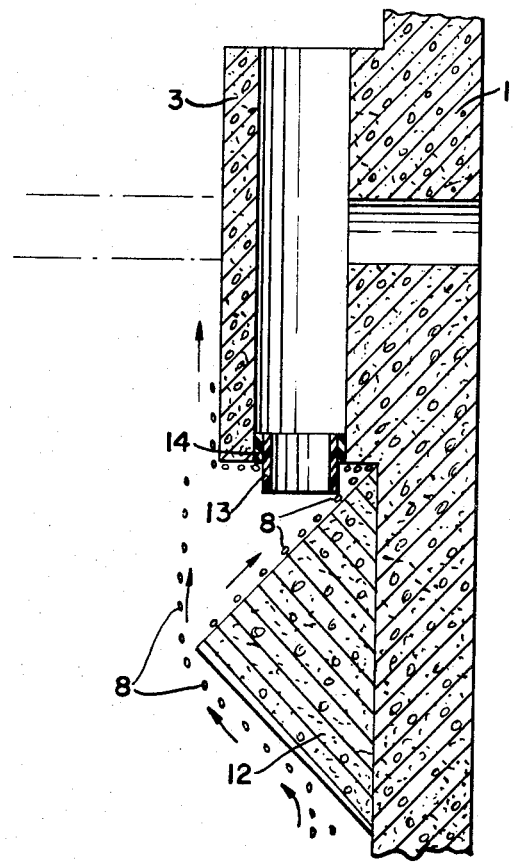
FIG. 8 is a fragmentary cross-sectional view of means for the deflection of gas borne solids from the effluent comprising a deflecting corbel and an outlet tee extension inserted in the outlet tee of a standard septic tank of the type shown in FIG. 7 taken along the lines 8—8.

A second type of means effective to deflect rising gas from the outlet tee and retain the digestible solids is shown in FIGS. 7 and 8. Corbel 12 is positioned below outlet tee 3 so that it extends into the digestion tank beyond the innermost extension of the outlet tee. Thus, rising gas-borne particles 8 are deflected beyond the outlet tee and rise to the scum layer in substantially vertical fashion. As some of the particles 8 ride along the upper surface of corbel 12, a cylindrical extension of the outlet baffle base is fastened to that baffle at its lowermost opening to assure more complete screening out of the rising solid particles 8. For example, cylinder 13 may be fitted into outlet tee 3 at its base and gas sealed by seal 14. Thus, most rising particles 8 that ride up the upper slope of corbel 12 would still be screened out of the liquid chamber in the outlet tee.

A third type of means for effectively deflecting rising particles from the effluent is shown in FIGS. 4, 5 and 6. This third type of means is particularly well suited to the type of standard septic tank that utilizes wall-type baffles rather than circular tees. Tank 21 is equipped with inlet baffle 22 and outlet baffle 23 between which the scum layer 5 is contained. The digestion chamber of tank 21 includes the scum layer 5 and the sludge layer 4 bounding the fermentation liquid layer wherein gas particles 8 are constantly rising. Freeboard 7 is covered by a lid placed over the top of tank 21.

In this type tank, a scum layer 24 will tend to form between baffle 23 and the outlet aperture 6 of tank 21. Outlet tee 30 is provided to prevent this scum and other solid matter from carrying over into the drain field. Outlet tee 30 is fastened into the outlet aperture 6 of tank 21 by means of some air tight seal 31. Outlet tee 30 is shown in FIG. 5 fastened in a standard septic tank of the baffle type in a suitable manner so that the particles 8 are deflected to the extremities of the base of cone 32. These particles then rise in a substantially vertical manner from the extremities of cone 32 and thereby avoid entering the liquid held in outlet tee 30. This prevents the carryover of these particles in the effluent passing off over the outlet aperture weir to the drain field.

Outlet tee 30 is provided with weakened ring 35 so that by breaking or cutting outlet tee 30 at this ring, the purchased outlet tee 30 can be easily converted to sleeve 9 for use with a standard septic tank having a built-in outlet tee 3. Outlet tee 30 is also provided with flange 33 and sealing ring 34 that aid in sealing and proper positioning of tee 30 and sleeve 9 as desired. The device is of such proportions as to properly serve the functions of venting, retaining scum and retaining solids.

I claim:

1. In a septic tank having an inlet aperture and an outlet aperture, a septic solids retainer capable of deflecting rising particles from said outlet aperture of the tank consisting of conic deflector means attached near its apex to a liquid enclosure means having an inlet aperture located above said deflector means and an outlet aperture in such manner that the periphery of the deflector means extends in a plane substantially perpendicular to the path of rise of the particles beyond the intersection of the vertical extension of the periphery of that inlet aperture of the liquid enclosure means with said plane, the outlet aperture of said liquid enclosure means attached to the outlet aperture of the septic tank in a substantially watertight manner so as to isolate the surface of the liquid in the liquid enclosure means from the surface of the liquid in the septic tank.

2. In a septic tank having an inlet aperture and an outlet aperture, a septic solids retainer as described in claim 1, the deflector means of said septic solids retainer comprising a cone having an apex of attachment to said liquid enclosure means of lesser cross-sectional area than the inlet aperture of said liquid enclosure means and a base of greater cross-sectional area than the inlet aperture of said liquid enclosures means.

3. A septic solids retainer consisting of conic deflector means attached near its apex to a liquid enclosure means having an inlet aperture located above said deflector means and an outlet aperture in such manner that the periphery of the deflector means extends in a plane substantially perpendicular to the centerline of the liquid enclosure means beyond the intersection with said plane of the extension of the periphery of that inlet aperture in a direction parallel to the centerline of the liquid enclosure means, said liquid enclosure means provided with means for attachment of said retainer in a substantially watertight manner.

4. A septic solids retainer as described in claim 3 in which said deflector means is a cone having an apex of attachment to said liquid enclosure means of lesser cross-sectional area than the inlet aperture of said liquid enclosure means and a base of greater cross-sectional area than the inlet aperture of said liquid enclosure means.

5. A septic solids retainer consisting of a substantially cylindrical element, an aperture in the wall of said cylindrical element, means at that aperture for attachment of said aperture in a substantially watertight manner, and a cone having a base of greater diameter than the inlet aperture of the cylindrical element and an apex of lesser diameter than the inlet aperture of the cylindrical element attached to the cylindrical element substantially at the inlet aperture of the cylindrical element by means attached to the approximate apex of said cone.

6. In combination, a septic solids retainer as described in claim 5 together with a septic tank having an inlet aperture and an outlet aperture, said retainer fastened to said tank in a manner sufficient to assure that all liquid flowing through said outlet aperture of the tank must flow flow through the inlet aperture of the cylindrical element to which the cone is attached.

7. In a septic tank having an inlet aperture and an outlet aperture, a septic solids retainer means of the type described in claim 5 attached to said tank in a manner such that said cone is attached beneath said cylindrical element with the base of said cone in a plane substantially perpendicular to the path of rise of the particles in said tank.

8. In a septic tank having an inlet aperture and an outlet aperture, a septic solids retainer consisting of a conic deflector means attached to a liquid enclosure means having an inlet aperture and an outlet aperture, said deflector means comprising a cone having an apex of lesser cross-sectional area than the inlet aperture of said liquid enclosure means and a base of greater cross-sectional area than the inlet aperture of said liquid enclosure means, the apex end of said deflector means attached to said liquid enclosure means approximately at the inlet aperture of said liquid enclosure means so that the periphery of the base end of said deflector means is capable of deflecting rising particles from entering said inlet aperture of said liquid enclosure means, and the outlet aperture of said liquid enclosure means is attached to the outlet aperture of the septic tank in a substantially watertight manner so as to isolate the surface of the liquid in the liquid enclosure means from the surface of the liquid in the septic tank.

9. In the septic tank described in claim 8, a septic solids retainer as described in claim 8 in which the periphery of the deflector means extends in a plane substantially perpendicular to the path of rise of the particles through the liquid in the septic tank beyond the intersection of the vertical extension of the periphery of that inlet aperture of the liquid enclosure means with said plane.

10. A septic solids retainer consisting of a biconic deflector means attached near one apex thereof to a liquid enclosure means having an inlet aperture located above said deflector means and an outlet aperture in such manner that the periphery of the biconic deflector means extends in a plane substantially perpendicular to the centerline of the liquid enclosure means beyond the intersection with said plane of the extension of the periphery of that inlet aperture in a direction parallel to the centerline of the liquid enclosure means.

11. In a septic tank having an inlet aperture and an outlet aperture, a septic solids retainer comprising a deflector means attached to a liquid enclosure means having an inlet aperture and an outlet aperture, said deflector means comprising a bicone having one apex of lesser cross-sectional area than the inlet aperture of said liquid enclosure means and a base of greater cross-sectional area than the inlet aperture of said liquid enclosure means, said one apex end of said deflector means attached to said liquid enclosure means approximately at the inlet aperture of said liquid enclosure means so that the periphery of the base of said deflector means is capable of deflecting rising particles from entering said inlet aperture of said liquid enclosure means, and the outlet aperture of said liquid enclosure means is attached to the outlet aperture of the septic tank in a substantially watertight manner so as to isolate the surface of the liquid in the liquid enclosure means from the surface of the liquid in the septic tank.

12. In a septic tank having an inlet aperture and an outlet aperture, a septic solids retainer capable of deflecting rising particles from the outlet aperture of the tank comprising a biconic deflector means attached at one apex thereof to a liquid enclosure means having an inlet aperture and an outlet aperture in such manner that the periphery of the base of the biconic deflector means extends in a plane substantially perpendicular to the path of rise of the particles beyond the intersection of the vertical extension of the periphery of that inlet aperture of the liquid enclosure means with said plane, the outlet aperture of said liquid enclosure means attached to the outlet aperture of the septic tank in a substantially watertight manner so as to isolate the surface of the liquid in the liquid enclosure means from the surface of the liquid in the septic tank.

* * * * *